United States Patent [19]

Brongo

[11] 4,004,819
[45] Jan. 25, 1977

[54] MOBILE TRUCK PROVIDED WITH IMPROVED REMOVABLE RACKS FOR PANS, TRAYS AND THE LIKE

[75] Inventor: Louis Joseph Brongo, Kingston, Pa.

[73] Assignee: Metropolitan Wire Corporation, Wilkes-Barre, Pa.

[22] Filed: July 29, 1975

[21] Appl. No.: 599,997

[52] U.S. Cl. .............................. 280/79.3; 211/181
[51] Int. Cl.[2] .......................................... B62B 5/00
[58] Field of Search ...................... 280/79.3, 36 R; 211/126, 177, 181

[56] References Cited
UNITED STATES PATENTS

| | | | |
|---|---|---|---|
| 2,478,458 | 8/1949 | Carter | 280/79.3 |
| 2,936,077 | 5/1960 | Carpenter | 211/126 |
| 3,007,708 | 11/1961 | Ochs | 280/79.3 |
| 3,199,683 | 8/1965 | Graswich | 211/126 |
| 3,655,063 | 4/1972 | Landry | 211/126 |

Primary Examiner—Robert R. Song
Attorney, Agent, or Firm—Friedman, Goodman & Teitelbaum

[57] ABSTRACT

An improved mobile truck for supporting a plurality of removable pans or trays includes a base having a plurality of rollable casters secured thereto. A pair of laterally spaced apart, generally U-shaped frame sections are secured to and extend upwardly from the sides of the base portion. Removable racks are mounted on each of the U-shaped side frame sections and include a first plurality of U-shaped rods that extend inwardly from the frame sections as well as in the direction between the legs of the U-shaped frame sections in order to support the pans or trays. A second plurality of U-shaped rods, similar in construction and orientation to the first plurality of U-shaped rods also extend inwardly from the frame sections and in the direction between the legs of the U-shaped frame sections for minimizing lateral movement of the pans or trays. Each rack is also provided with pairs of vertically oriented rods at each end which pairs of rods are arranged to snap into engagement with the vertical legs of the U-shaped frame sections in order to secure the racks thereto. Alternatively, vertically oriented rods may be utilized instead of the second plurality of the U-shaped rods as the retaining members for minimizing lateral movement of the pans or trays. Still other vertical rods are secured to the rack for support thereof, and in order to separate the front and rear sections thereof so that the truck may be loaded and unloaded from either the front or the rear.

16 Claims, 8 Drawing Figures

MOBILE TRUCK PROVIDED WITH IMPROVED REMOVABLE RACKS FOR PANS, TRAYS AND THE LIKE

BACKGROUND OF THE INVENTION

This invention relates generally to rollable, article carriers or the like and more particularly to a mobile truck as well as improved rack means therefor for supporting a plurality of removable pans or trays.

It is well known to provide a mobile truck for supporting a plurality of movable pans or trays thereon. However, features of the present invention include a simplified placement of the pan or tray supporting racks and ease of assembly, as well as low cost of manufacture, which are not disclosed in the prior art. The truck comprising the present invention may be shipped in a knocked-down condition rather than in a partially or fully assembled conditions as required in the prior art.

SUMMARY OF THE INVENTION

In its broadest aspect, the present invention provides a mobile truck having a base portion that includes casters for permitting easy transport thereof. A plurality of inverted, U-shaped frame sections are secured to the base so that both ends of the truck are open for loading and unloading. In addition, removable rack means are provided so that a plurality of pans or trays may be stacked thereon in vertically spaced orientation. The rack means include a first plurality of vertically spaced, horizontal U-shaped rods wherein the two spacedly opposed legs of the U-shaped rods extend inwardly of the planes of the U-shaped frame members. The bights of these first mentioned plurality of U-shaped rods provide the means on which the pans or trays are supported. A second plurality of U-shaped rods may also be provided with the two spacedly opposed legs of the second plurality of rods being somewhat shorter than the comparable legs of the first plurality of rods whereby the bights of the second plurality of U-shaped rods define stop means for limiting lateral movement of the pans or trays that are positioned on the first plurality of U-shaped rods. In order to connect the U-shaped rods as a unit, and to retain the rack means on the frame sections, two pairs of vertical rods are secured to the spacedly opposed legs of the first and second plurality of U-shaped rods. The spacing between the vertical rods of each pair is approximately the same as the maximum dimension of the legs of the U-shaped frame sections, so that each pair of vertical rods may snap about and straddle one of the legs of the U-shaped frame sections and thereby retain the rack thereon. In one embodiment of the present invention, each U-shaped frame section supports two racks, one above the other.

Accordingly, it is an important object of the present invention to provide an improved mobile truck having racks for supporting a plurality of removable pans or trays thereon, where the truck and racks can be shipped in a knocked-down condition and easily assembled.

Another object of the present invention is to provide an improved rack that may be removably secured to the mobile truck, where the rack is snapped into position.

BRIEF DESCRIPTION OF THE DRAWINGS

With the above and additional objects and advantages in view, as will hearinafter appear, this invention comprises the devices, combinations and arrangements of parts hereinafter described by way of example and illustrated in the accompanying drawings of a preferred embodiment in which.

DESCRIPTION OF THE PREFERRED EMBODIMENTS

Figure 1:
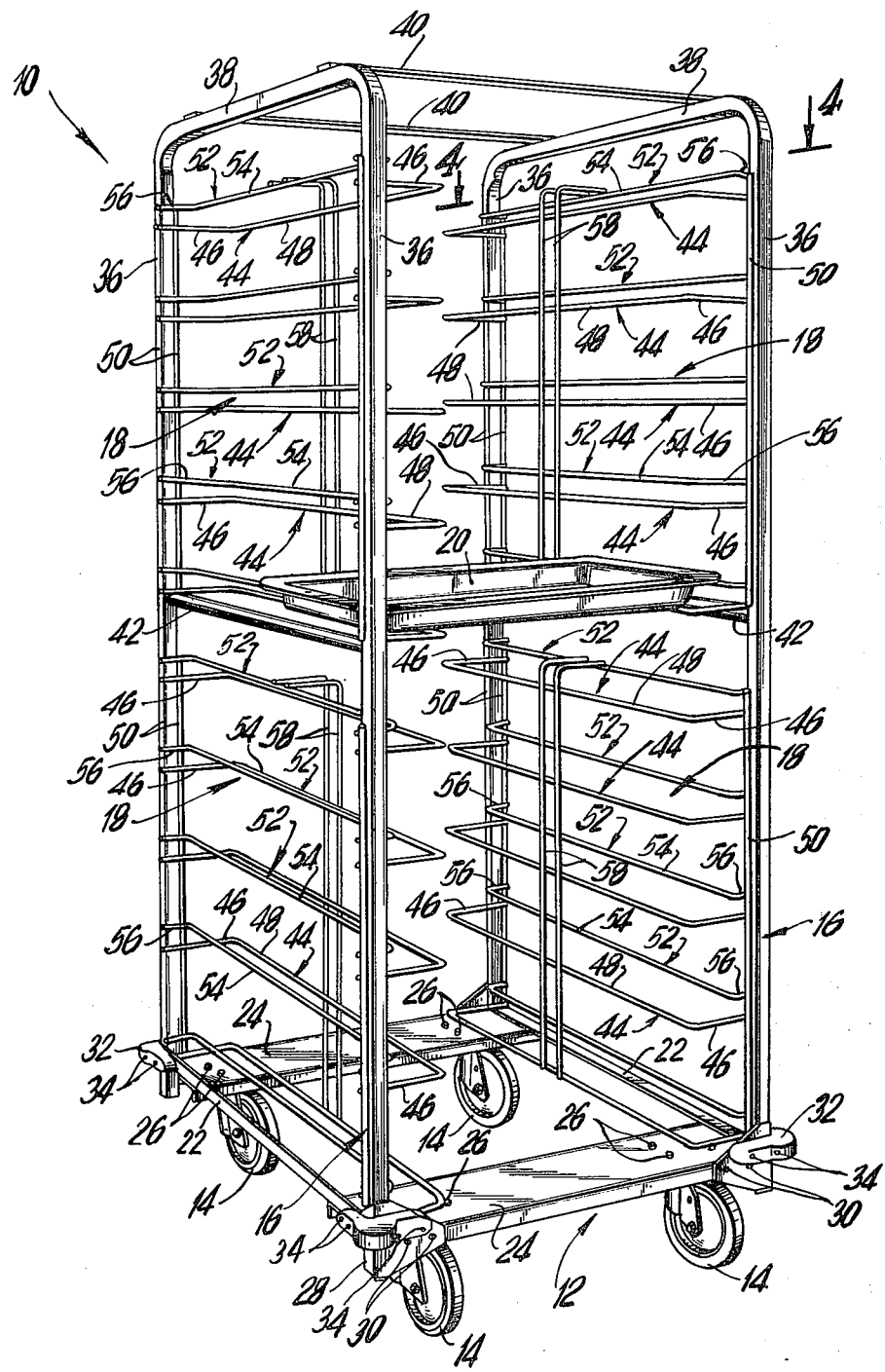
FIG. 1 is a perspective view of one embodiment of the mobile truck according to the present invention.

Referring first FIG. 1 there is shown an improved mobile truck 10 comprising the present invention. The truck 10 includes a base portion generally designated by the reference character 12, a plurality of rollable casters 14 secured to and depending downwardly from the base portion 12, a pair of inverted U-shaped side frame sections 16, and a plurality of racks, each of which is generally designated by the reference character 18. As will be explained more fully hereinafter, a plurality of pans or trays 20 are arranged to be removably supported on portions of opposed racks 18.

The base portion 12 includes a pair of laterally spaced apart side members 22 in the form of bars. In addition, the base portion 12 includes a pair of spaced apart end members 24 in the form of U-shaped channels. The bars 22 and the channels 24 are secured to each other by conventional fastening means to form an open, generally rectangular frame. It should be understood that a rectangular or square plate may also be used; however, the construction illustrated is lighter and is less costly. The casters 14 are, in the embodiment illustrated, secured to the channels 24 by means of a plurality of fasteners 26.

Corner braces 28 are secured to the side members 22 and the end members 24 of the base portion 12 such as by fasteners 30 or the like. In addition, resilient bumpers 32 are secured to the corner braces 28 by any suitable means such as fasteners 34.

The pair of upright, inverted, U-shaped side frame sections 16 are laterally spaced apart and the lower ends thereof are secured to the corner braces 28 by any convenient fastening means. The side frame sections 16, which may be bent rectangular or square tubing, are each comprised of a pair of spaced apart, vertically oriented legs 36 and a top connecting bight section 38. A pair of straps 40 are used to connect the top sections 38 of the two laterally spaced apart frame sections 16 to each other. In addition, and for purposes to be described more fully hereinafter, a central bar 42 is provided so as to extend between the spaced apart legs 36 of each frame section 16, in a fixed position.

Reference may now be had to FIGS. 2-5 for a description of the racks 18, as well as the manner of assembling the racks 18 to the frame sections 16. As shown for example in FIG. 2, each rack 18 includes a first plurality of U-shaped rods 44 each of which includes a pair of spaced apart legs 46 and a longitudinally extending bight section 48 that connects one end of each of the legs 46. The U-shaped rods 44 are positioned in vertical, spaced orientation. The connecting bight portions 48 of the U-shaped rods 44 define means for supporting the trays or pans 20. Each rack 18 further includes two pairs of rods 50 which are spaced apart from each other and are vertically oriented. The rods 50 are secured to the legs 46 of the U-shaped rods 44 to hold the rods 44 in the vertical, spaced orientation.

Figure 2:
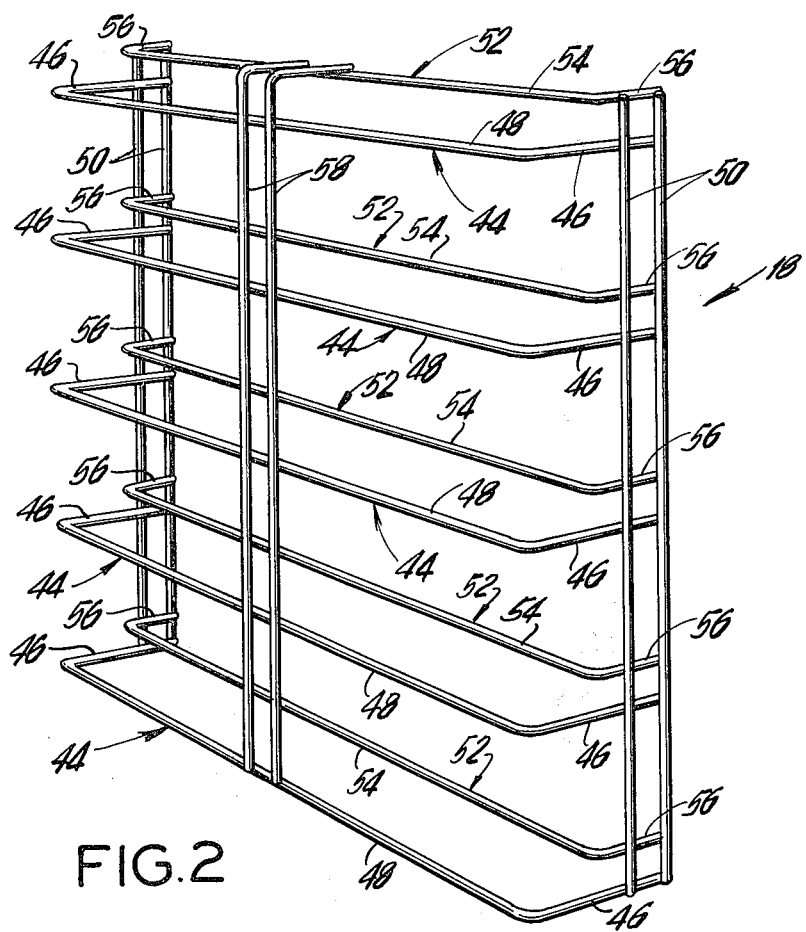
FIG. 2 is a perspective view of one embodiment of the improved rack according to the present invention.

In the embodiment illustrated in FIG. 2, there is a second plurality of U-shaped rods 52 each of which includes a pair of spaced apart legs 56 and a connecting bight section 54. The bight sections 48 and 54 have the same length. The legs 56 are shorter than the legs 46 of the first plurality of U-shaped rods 44 and thereby the rods 52 define means for limiting any transverse movement of the trays or pans 20. The rods 50 are also secured to the legs 56 of the U-shaped rods 52 to hold the rods 52 in a vertical, spaced orientation, where each rod 52 is spaced above an associated rod 44. As shown in FIG. 1, for example, the outward ends of the bottom surface of the tray 20 rests on opposed connecting bights 48 of the first plurality of U-shaped rods 44, while the vertical side walls of the tray 20 are positioned to abut the opposed connecting bights 54 of the second plurality of U-shaped rods 52, such that the flange of the tray 20 overlays the opposed connecting bights 54. It will be appreciated, therefore, that the several connecting bights 48 provide means for supporting a plurality of trays in vertically spaced orientation while the connecting bights 54 limit the lateral movement of the tray 20 with respect to the side frame sections 16 of the truck 12.

As shown, for example, in FIG. 2, each rack 18 is also provided with another pair of vertical rods 58 that are secured to each of the connecting bights 48 proximate the mid point thereof and also to the proximate mid point of the top connecting bight 54. The rods 58 are spaced apart and serve as additional supports for the bights 48 which hold the trays 20, and also function as stop means for the insertion of the trays 20 as shown in FIG. 1. Thus, the truck 12 may be loaded and unloaded from either end, where the rods 44 are sufficiently supported and maintained in position by the vertical rods 50, 58.

Figure 4:
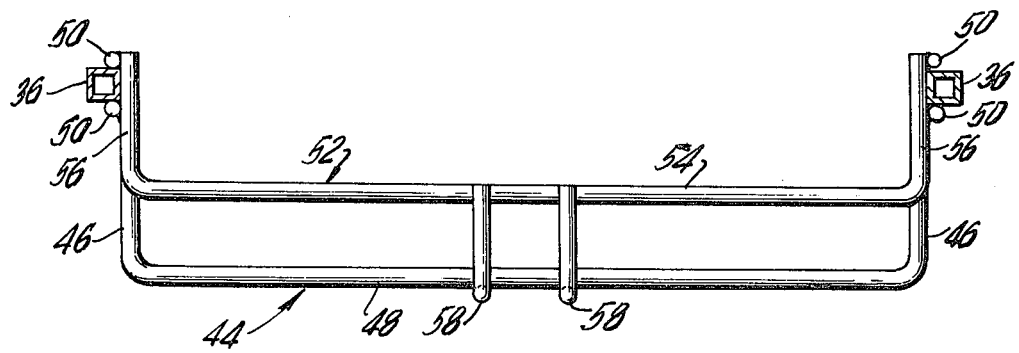
FIG. 4 is a sectional top plan view with portions removed for clarity and taken along line 4—4 of FIG. 1.
Figure 5:
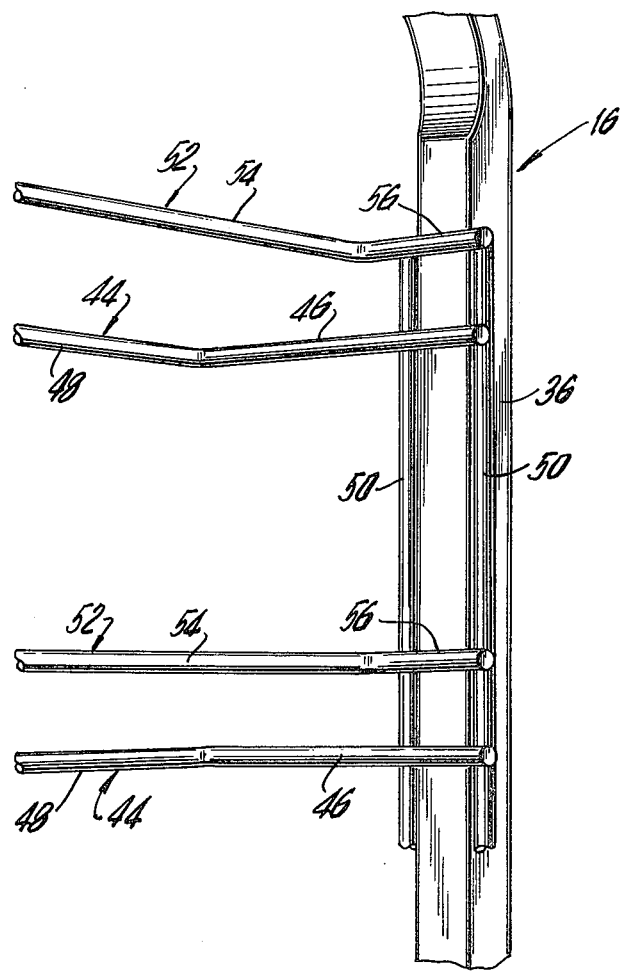
FIG. 5 is a fragmentary, perspective view on an enlarged scale illustrating the manner in which the rack is removably secured to one leg of the frame section.

FIG. 4 and FIG. 5 best illustrate the manner in which the racks 18 are secured to the frame sections 16. The spacing between the adjacent rods 50 of each pair of vertical rods 50 is selected such that it is at least equal to the maximum cross-sectional dimension of the frame legs 36 of each frame section 16. The spacing between the opposing outer surfaces of the spaced apart legs 46, 56 of each U-shaped rod 44, 52 is selected such that it is approximately equal to the longitudinal spacing between the opposing inner surfaces of the legs 36 of each frame section 16 so that the rack legs 46, 56 abut against the frame legs 36 as best shown in FIG. 4. It is noted that the rack legs 46, 56 are slightly resilient with respect to the bights 48, 54 to permit deflecting thereof as set before.

Figure 3:
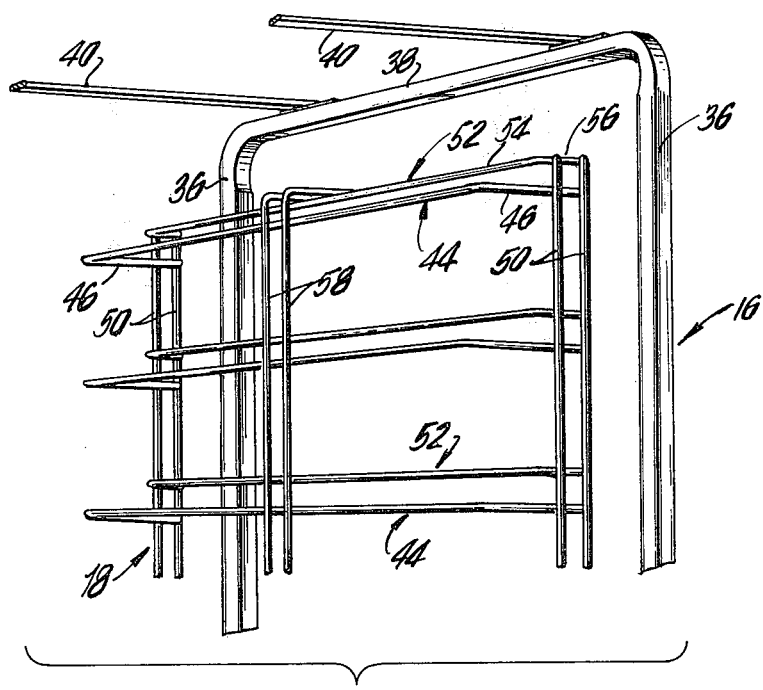
FIG. 3 is an exploded fragmentary view, in perspective, illustrating the manner in which the rack is assembled to one of the frame sections of the truck.

Thus, the legs 46 of the plurality of U-shaped holding rods 44 and the legs 56 of the plurality of U-shaped abutment rods 52 as shown in FIG. 3 are deflected slightly inwardly so that the vertical rods 50 can snap around each of the vertical and laterally spaced apart legs 36 of each frame section 16. As shown in FIG. 1 for example, the lowermost U-shaped rod 44 of the upper rack 18 in each frame section 16 rests on the central horizontal bars 42 that extend between the legs 36 of each frame section 16 while the lowermost U-shaped rod 44 of the lower rack 18 in each frame section 16 rests on the base 12. It should also be appreciated that the racks 18 may be easily removed by deflecting the legs 46 and 56 of each rack 18 towards each other.

Figure 6:
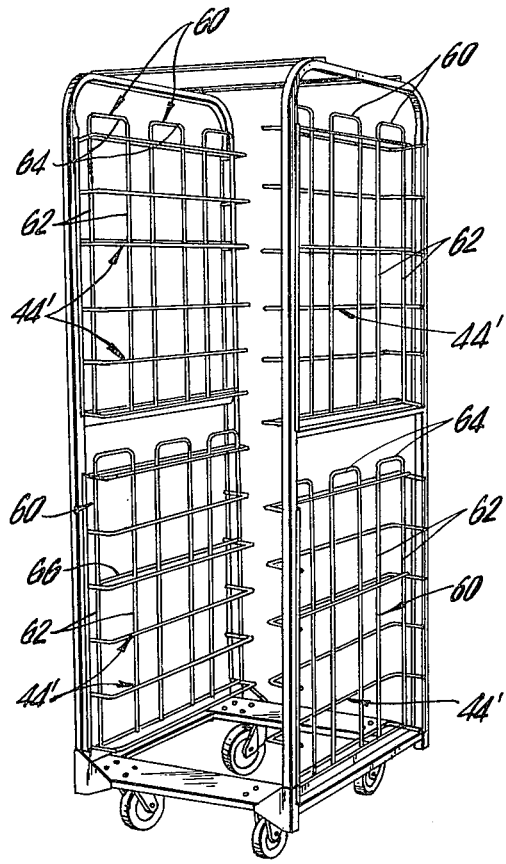
FIG. 6 is a perspective view of the improved mobile truck according to the present invention with an alternative form of rack mounted thereon.
Figure 8:
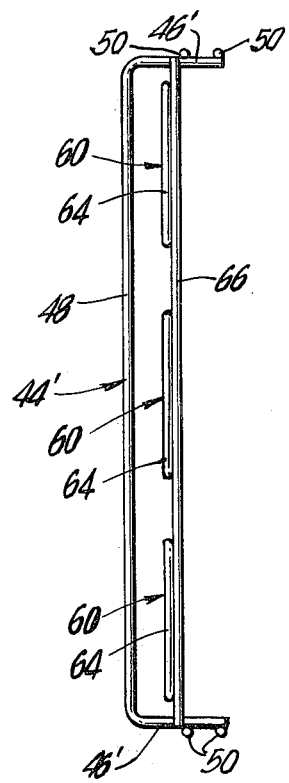
FIG. 8 is a top plan view of the alternative form of rack.
Figure 7:
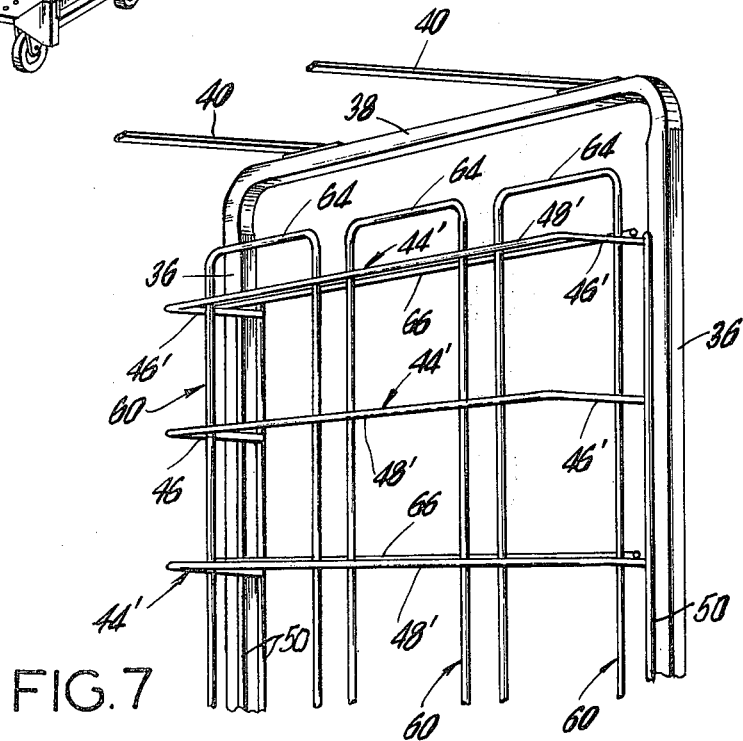
FIG. 7 is a fragmentary, perspective view on an enlarged scale, illustrating a portion of the alternative form of rack as shown in FIG. 6.

An alternative embodiment of the rack according to the present invention is shown in FIGS. 6-8. In this second embodiment the plurality of U-shaped abutment rods 52 shown and described in connection with the first embodiment is eliminated and is replaced by a plurality of vertically oriented U-shaped rods 60, each of which includes a pair of spaced apart legs 62 and a connecting, horizontal bight 64 at the upper end thereof. The U-shaped rods 60 are secured to a plurality of horizontal rods 66 that extend between the spaced apart legs 46' of the plurality of U-shaped holding rods 44' as described above in the first embodiment. The rods 66 also serve to additionally support the rack by securing the legs 46' of selected holding rods 44' together. It will be appreciated that the U-shaped rods 60 are opposedly horizontally spaced apart further from one frame section 16 to the other frame section 16 than the opposed connecting bights 48' of the plurality of U-shaped holding rods 44' and thereby serve as means for limiting lateral movement of the trays 20 when the trays 20 are seated on the connecting bights 48' of the plurality of U-shaped holding rods 44'. All the remaining portions of the embodiment shown in FIGS. 6-8 are the same as shown in connection with the first embodiment so that a further description thereof is not necessary.

From the foregoing, it will be appreciated that an improved, low cost mobile truck, having easily insertable racks for removably supporting a plurality of pans or trays has been provided. It will be evident that the improved truck may be shipped in a partially assembled, fully assembled or in the knocked-down condition. The truck is extremely compact and is highly maneuverable by virtue of relatively large casters which also provide additional stability. The truck may be made of rugged tubular members and heavy gauge wire or rods.

There has been disclosed heretofore the best embodiments of the invention presently contemplated. However, it is to be understood that various changes and modifications may be made thereto without departing from the spirit of the invention.

What is claimed is:

1. A device for supporting a plurality of removable pans, trays and the like thereon, said device comprising:
   a base portion;
   a pair of laterally spaced apart side frame sections provided with spaced apart legs secured to and extending upwardly from said base portion; and removable racks mounted on said frame sections for supporting said pans, trays and the like on said device, said racks including support means for spacedly stacking a plurality of pans, trays and the like, one above the other between said laterally spaced apart frame sections, said racks further including retaining means cooperating with said side frame sections to provide a releaseable engagement therewith;

said retaining means of each said rack including two pairs of vertically oriented, spaced apart, associated retaining rods secured to opposite free ends of said support means, the spacing between each of said pair of said associated retaining rods being at least equal to maximum cross-sectional dimension of each associated leg of said side frame sections such that a releaseable snap engagement is created therebetween.

2. A device according to claim 1, wherein said side frame sections are inverted U-shaped members each including a pair of said spaced apart legs, lower ends of said legs being secured to said base portion with a transverse bight of each member connecting upper ends of said frame section legs, said support means of said racks including a plurality of U-shaped holding rods, each holding rod having a pair of spaced apart legs and a connecting bight extending therebetween, at least one rack being disposed on each U-shaped member with said holding rods being positioned in vertically spaced apart horizontal planes with associated holding rods of each rack being in the same horizontal plane to define said support means for said pans, trays and the like, said retaining rods being secured to free ends of said spaced apart legs of said holding rods.

3. A device according to claim 2, wherein said pair of spaced apart legs of said side frame sections are substantially rectangular in cross-section.

4. A device according to claim 2, wherein there is further included at least one additional vertical rod for each rack secured to said connecting bights of said U-shaped holding rods of each rack proximate the mid-point of each rod bight to define separating means for the pans, trays and the like positioned on each of said U-shaped holding rods and to also provide support for said rod bights of each rack.

5. A device according to claim 2, wherein said racks include a second plurality of U-shaped abutment rods each having a pair of spaced apart legs and a connecting bight extending therebetween, said spaced apart legs of said U-shaped abutment rods being shorter than said spaced apart legs of said U-shaped holding rods and being secured to said two pairs of vertically oriented, spaced apart retaining rods whereby a first portion of said pans, trays and the like is supported on at least a portion of said U-shaped holding rods and a second portion of said pans, trays and the like is in position to abut with at least a portion of said U-shaped abutment rods to thereby limit movement of said pans, trays and the like in a direction transverse to the direction of said connecting bights of said U-shaped abutment rods.

6. A device according to claim 2, wherein there are further included a plurality of horizontal positioning rods secured to and extending between said spaced apart legs of at least some of said U-shaped holding rods of each rack and in spaced relationship with said connecting bights of said U-shaped holding rods, and stop means including a plurality of spaced apart, vertical abutment rods secured to said horizontal positioning rods of each rack for limiting transverse movement of said pans, trays and the like relative to said horizontal positioning rods.

7. A device according to claim 6, wherein at least one end of each of said vertical abutment rods is connected in pairs by horizontal bights to define U-shaped arrangements.

8. A device according to claim 2, wherein there are four of said racks, two of said racks being mounted on each of said frame sections one above the other, each of said side frame sections including a horizontal bar extending between said spaced apart legs thereof for supporting the upper ones of said racks, said lower ones of said racks being supported on said base portion.

9. A device according to claim 2, wherein said base portion is provided with rollable means depending therefrom for movement of said device to define a mobile truck.

10. An improved removable rack for a device including a base portion having a pair of laterally spaced apart side frame sections provided with legs secured to and extending upwardly from the base portion, said rack being adapted to be removably mounted on the frame sections for supporting a plurality of removable pans, trays and the like, said removable rack comprising:

support means for spacedly stacking a plurality of pans, trays and the like, one above the other between the laterally spaced apart frame sections, and retaining means cooperating with the side frame sections to provide a releaseable engagement therewith;

said retaining means of said rack including two pairs of vertically oriented, spaced apart, associated retaining rods secured to opposite free ends of said support means, the spacing between each of said pair of said associated retaining rods being at least equal to maximum cross-sectional dimension of each associated leg of the side frame sections such that a releaseable snap engagement is created therebetween.

11. A rack according to claim 10, wherein said support means comprises a plurality of U-shaped holding rods each having a pair of spaced apart legs and a connecting bight extending therebetween, said holding rods being positioned vertically spaced apart in horizontal planes to define said support means for the pans, trays and the like, said retaining rods being secured to free ends of said spaced apart legs of said holding rods.

12. A rack according to claim 11, wherein there is further included at least one additional vertical rod secured to said connecting bights of said U-shaped holding rods proximate the mid-point of each rod bight to define separating means for the pans, trays and the like, positioned on each of said U-shaped folding rods, and to also provide support for said rod bights.

13. A rack according to claim 12, wherein there are two of said additional vertical rods spaced apart from each other.

14. A rack according to claim 11, wherein said rack includes a second plurality of U-shaped abutment rods each having a pair of spaced apart legs and a connecting bight extending therebetween, said spaced apart legs of said U-shaped abutment rods being shorter than said spaced apart legs of said U-shaped folding rods and being secured to said two pairs of vertically oriented, spaced apart retaining rods whereby a first portion of the pans, trays and the like, is supported on at least a portion of said U-shaped folding rods and a second portion of the pans, trays and the like is in position to abut with at least a portion of said U-shaped abutment rods to thereby limit movement of the pans, trays and the like in a direction transverse to the direction of said connecting bights of said U-shaped abutment rods.

15. A rack according to claim 11, wherein there are further included a plurality of horizontal positioning rods secured to and extending between said special apart legs of at least some of said U-shaped holding rods and in spaced relationship with said connecting bights of said U-shaped holding rods, and stop means including a plurality of spaced apart, vertical abutment rods secured to said horizontal positioning rods for limiting transverse movement of said pans, trays and the like relative to said horizontal positioning rods.

16. A rack according to claim 15, wherein at least one end of each of said vertical abutment rods is connected in pairs by horizontal bights to define U-shaped arrangements.

* * * * *